United States Patent
D'Amico et al.

(10) Patent No.: US 10,307,711 B2
(45) Date of Patent: Jun. 4, 2019

(54) CEMENT KILN EXHAUST GAS POLLUTION REDUCTION

(71) Applicant: Mercury Capture Intellectual Property, LLC, Louisville, KY (US)

(72) Inventors: Peter D'Amico, Newtown, CT (US); Thomas Lesniak, Clifton Park, NY (US); Christopher Poling, Bel Air, MD (US)

(73) Assignee: MERCURY CAPTURE INTELLECTUAL PROPERTY, LLC, Louisville, KY (US)

( * ) Notice: Subject to any disclaimer, the term of this patent is extended or adjusted under 35 U.S.C. 154(b) by 0 days.

(21) Appl. No.: 16/131,881

(22) Filed: Sep. 14, 2018

(65) Prior Publication Data

US 2019/0015779 A1    Jan. 17, 2019

Related U.S. Application Data

(62) Division of application No. 15/357,261, filed on Nov. 21, 2016, which is a division of application No.
(Continued)

(51) Int. Cl.
*B01D 47/00* (2006.01)
*B01D 53/64* (2006.01)
(Continued)

(52) U.S. Cl.
CPC ............. *B01D 53/64* (2013.01); *B01D 53/14* (2013.01); *B01D 53/78* (2013.01); *C04B 7/364* (2013.01);
(Continued)

(58) Field of Classification Search
None
See application file for complete search history.

(56) References Cited

U.S. PATENT DOCUMENTS

| 4,844,815 A | 7/1989 | Ader et al. |
| 5,219,544 A | 6/1993 | Kupper et al. |

(Continued)

FOREIGN PATENT DOCUMENTS

| DE | 3840858 A1 | 9/1989 |
| EP | 1649922 A1 | 4/2006 |

(Continued)

OTHER PUBLICATIONS

CyCurex® flyer, Mar. 2009.
(Continued)

*Primary Examiner* — Amber R Orlando
*Assistant Examiner* — Phillip Y Shao
(74) *Attorney, Agent, or Firm* — Moore & Van Allen PLLC; Henry B. Ward, III

(57) ABSTRACT

A method for reducing pollution in a cement kiln environment and a system for treating cement kiln exhaust gas are provided. The method includes the steps of: treating a cement kiln exhaust gas stream with a treating fluid, such as a water soluble alkaline-earth metal sulfide. In one application, the treating fluid is injected by spraying droplets into the cement kiln exhaust gas stream. A system for treating cement kiln exhaust gas includes a reagent containing a water soluble alkaline-earth metal sulfide in water, and a nozzle to spray the reagent into the cement kiln exhaust gas stream.

19 Claims, 13 Drawing Sheets

Related U.S. Application Data

13/808,031, filed as application No. PCT/US2011/042749 on Jul. 1, 2011, now Pat. No. 9,498,747.

(60) Provisional application No. 61/373,299, filed on Aug. 13, 2010, provisional application No. 61/360,980, filed on Jul. 2, 2010.

(51) Int. Cl.

| | | |
|---|---|---|
| *B01D 53/78* | (2006.01) | |
| *C04B 7/43* | (2006.01) | |
| *B01D 53/14* | (2006.01) | |
| *F27D 17/00* | (2006.01) | |
| *C04B 7/36* | (2006.01) | |

(52) U.S. Cl.
CPC ............ *C04B 7/436* (2013.01); *F27D 17/008* (2013.01); *B01D 2251/40* (2013.01); *B01D 2257/602* (2013.01); *B01D 2258/0233* (2013.01)

(56) References Cited

U.S. PATENT DOCUMENTS

| | | |
|---|---|---|
| 6,214,304 B1 | 4/2001 | Rosenthal et al. |
| 6,516,610 B2 | 2/2003 | Hodgson |
| 6,818,043 B1 | 11/2004 | Chang et al. |
| 6,838,504 B1 | 1/2005 | Webster et al. |
| 6,942,840 B1 | 9/2005 | Broderick |
| 7,407,602 B2 | 8/2008 | Hurley |
| 7,771,683 B2 | 8/2010 | Hurley |
| 7,776,294 B2 | 8/2010 | Hurley |
| 2002/0108368 A1 | 8/2002 | Hodgson |
| 2004/0122277 A1 | 6/2004 | Heller et al. |
| 2005/0244319 A1 | 11/2005 | Hurley |
| 2006/0094920 A1 | 5/2006 | Roper |
| 2007/0092418 A1 | 4/2007 | Mauldin et al. |
| 2009/0081093 A1 | 3/2009 | Comrie |
| 2009/0193968 A1 | 8/2009 | Jepsen et al. |
| 2009/0202407 A1 | 8/2009 | Hurley |
| 2009/0283016 A1 | 11/2009 | Mohamed et al. |
| 2010/0000406 A1 | 1/2010 | Schwab et al. |
| 2010/0068109 A1 | 3/2010 | Comrie |
| 2010/0158773 A1 | 6/2010 | Schwab |
| 2010/0300864 A1 | 12/2010 | Jepsen et al. |
| 2011/0195003 A1 | 8/2011 | Durham et al. |

FOREIGN PATENT DOCUMENTS

| | | | |
|---|---|---|---|
| EP | 1842836 A1 | 10/2007 | |
| EP | 1923366 A1 | 5/2008 | |
| JP | H03504098 A | 9/1991 | |
| JP | H0416235 A | 1/1992 | |
| JP | H04176322 A | 6/1992 | |
| JP | 2002254049 A | 9/2002 | |
| JP | 2002355531 A | 12/2002 | |
| JP | 2003192407 A | 7/2003 | |
| JP | 2007535406 A | 12/2007 | |
| JP | 2008237959 A | 10/2008 | |
| JP | 2010137163 A | 12/2008 | |
| RU | 2219987 C2 | 12/2003 | |
| RU | 2244016 C2 | 1/2005 | |
| RU | 2286200 C2 | 10/2006 | |
| WO | 2008008475 A3 | 1/2008 | |
| WO | 2012003423 A2 | 1/2012 | |

OTHER PUBLICATIONS

Hurley et al., "Agreement between Cylenchar Limited and EES," dated Apr. 9, 2010.
Transcripts of the evidentiary hearings in the London Court of International Arbitration, Day 1.
Nowak et al., E-mail dated Jun. 16, 2010, to among others the inventors of the application.
"Final Program," The Joint Conference: International Thermal Treatment Technology (IT3) & Hazardous Waste Combusters (HCW) May 18, 2009, pp. 1-16.
Hurley, "CyCurex A revolution in Clean Air Technology," Cylenchar Limited, 2009, pp. 1-4.
Hurley, "Evaluation of the CyCurex Reagent System for the Removal of Mercury from Coal Combustion Gases, carried out at the Southern Research Institute," Cylenchar Limited, Jun. 16, 2010, pp. 1-35.
Gossman, "Precalciner Cement Kiln Mercury (Hg) Emissions Control," GCI Tech Notes, Feb. 2007.
Gossman, "Alternatives to ACI," International Cement Review, May 2011.
International Search Report for corresponding International Patent Application No. PCT/US2011/042749 dated Oct. 16, 2012.
Written Opinion for corresponding International Patent Application No. PCT/US2011/042749 dated Oct. 16, 2012.
European Office Action for corresponding European Patent Application No. 11801474.5 dated Jun. 27, 2016.
European Office Action for corresponding European Patent Application No. 11801474.5 dated Mar. 1, 2016.
European Office Action containing Supplemental European Search Report for corresponding European Patent Application No. 11801474.5 dated May 13, 2014.
European Office Action containing Supplemental European Search Report for corresponding European Patent Application No. 11801474.5 dated Apr. 24, 2014.
Canadian Office Action for corresponding Canadian Patent Application No. 2,803,662 dated Mar. 7, 2014.
Australian First Examination Report for corresponding Australian Patent Application No. 2011272725 dated Oct. 28, 2013.
New Zealand First Examination Report for corresponding New Zealand Patent Application No. 605206 dated Aug. 9, 2013.
English translation of Japanese Notification of Reasons for Refusal for corresponding Japanese Patent Application No. 2013-518751 dated Dec. 16, 2014.
Japanese Office Action, and English language summary thereof, for corresponding Japanese Patent Application No. 2015-083329 dated Jun. 23, 2015.
English translation of Japanese Notification of Reasons for Refusal for corresponding Japanese Patent Application No. 2015-083329 dated Jan. 26, 2016.
Russian Office Action, together with an English translation thereof, for corresponding Russian Patent Application No. 2013104362 dated Mar. 20, 2014.
English translation of Russian Decision of Rejection for corresponding Russian Patent Application No. 2013104362 dated Jul. 20, 2015.
European Office Action for corresponding European Patent Application No. 11801474.5 dated Aug. 28, 2018.
Japanese Notification of Reasons for Refusal, together with an English translation thereof, for corresponding Japanese Patent Application No. 2013-518751 dated Jan. 7, 2014.

| Run | Time (min) | Reagent Ratio to Water | Treating Fluid Injection | | Avg. Kiln Feed (TPH) | Avg. Total Inlet Mercury (ug/m³) | Avg. Total Outlet Mercury (ug/m³) | Percent Mercury Captured |
|---|---|---|---|---|---|---|---|---|
| | | | Reagent Avg. (GPM) | Water Avg. (GPM) | | | | |
| 1 | 30 | 0 | 0 | 0 | 300 | - | 512.6 | - |
| 2 | 30 | 0 | 0 | 0 | 300 | - | 532.3 | - |
| 3 | 30 | 1:4 | 3 | 12 | 335 | 480 | 281.8 | 41.3 |
| 4 | 30 | 1:4 | 3 | 12 | 299 | 480 | 326.6 | 32 |
| 5 | 15 | 1:4 | 6.5 | 24 | 284 | 497 | 203.5 | 59 |
| 6 | 15 | 1:4 | 6.5 | 24 | 284 | 475 | 223.3 | 52.9 |

Table 1. Data collected through the use of the integrated injection system.

Fig. 13

CEMENT KILN EXHAUST GAS POLLUTION REDUCTION

CROSS-REFERENCE TO PRIORITY APPLICATION

This application is a divisional of U.S. patent application Ser. No. 15/357,261 for a "CEMENT KILN EXHAUST GAS POLLUTION REDUCTION," filed on Nov. 21, 2016, which itself claims the benefit of U.S. patent application Ser. No. 13/808,031 (now U.S. Pat. No. 9,498,747) filed Jul. 23, 2013, which itself claims the benefit of PCT Patent Application No. PCT/US2011/042749 filed Jul. 1, 2011, which itself claims the benefit of U.S. Provisional Patent Application No. 61/373,299 filed Aug. 13, 2010, and U.S. Provisional Patent Application No. 61/360,980 filed Jul. 2, 2010. Each of the foregoing patent applications are hereby incorporated by reference in their entirety.

FIELD

The present disclosure relates to heavy-metal pollution reduction in the cement kiln environment.

BACKGROUND

Cement kiln exhaust gases vary significantly and typically contain volatile heavy metals, such as mercury, which are generally volatilized from the raw materials and fuels during the clinkering process, and carried into the atmosphere. Cement kiln exhaust gases typically contain oxides of carbon, sulfur, nitrogen, alkalis, excess chlorides and volatile heavy metals such as mercury. Mercury in both its elemental and ionic form are generally continually emitted through the cement kiln exhaust stack in varying concentrations dependent upon the operation of the kiln, in-line raw mill and raw material or fuel inputs.

These gases may also be re-used for drying and heating within the inline raw mill and then exit the process as cement kiln exhaust gas. The heavy metals within the gases may then be released to the atmosphere after they pass through a kiln baghouse electrostatic precipitator, or other particulate collection apparatus.

Typical mercury concentrations in cement kiln exhaust gases may vary significantly and are highly dependent on the raw materials, process conditions, and fuels burned in the clinkering process at each site. Previous attempts to capture and contain mercury from cement kiln exhaust gas in both its elemental and its oxide form have generally had mixed results. These processes may also be expensive. These processes include activated carbon injection, flue gas desulphurization scrubbers, and sorbent technology. These processes do not generally render the residual mercury in a stable, non-leachable form which can be used as a process addition while having no detrimental effects on the resulting portland cement or concrete.

Treatment processes for power plants such as those disclosed in Hurley U.S. Pat. Nos. 7,407,602, 7,771,683, and 7,776,294 are likewise inapplicable or inappropriate to the environment of the cement kiln for a variety of reasons.

SUMMARY

In an illustrative embodiment, a method for treating cement kiln exhaust gas is disclosed. The method includes providing a cement kiln exhaust gas stream from a kiln; providing a reagent containing a water soluble alkaline-earth metal polysulfide; combining the cement kiln exhaust stream with the reagent to create a combined stream; and removing at least a portion of one heavy metal, such as mercury, from the combined stream. The method may further include passing the combined stream through a particulate collection system and recycling the collected particulate for use as raw material in the kiln.

In combining the cement kiln exhaust stream with the reagent, the method may include spraying the reagent into the cement kiln exhaust stream. The method may include combining the reagent with water prior to combining the cement kiln exhaust stream with the reagent. The ratio of reagent to water may vary significantly from cement kiln to cement kiln. Factors affecting the amount of reagent used or its ratio to water may include the kiln exhaust's particulate load, dispersion, exhaust gas velocity, presence and amount of metals other than mercury, and any number of other environmental or processing parameters. It is often desirable to use as little of the reagent as needed to achieve the desired amount of mercury reduction. In one set of cement kiln applications, the reagent and the water may be combined in ratios ranging from about 1:3 to about 1:6.

The method may also include providing at least one of a surfactant, a dispersant, and a hyperdispersant, and combining the reagent and water with the at least one of the surfactant, the dispersant, and the hyperdispersant prior to combining the cement kiln exhaust stream with the reagent.

The reagent containing the water soluble alkaline-earth metal polysulfide may include the water soluble alkaline-earth metal polysulfide in a concentration of about 20% to about 40% in water, and more particularly in a concentration of about 30% in water.

In an illustrative embodiment, a method for reducing pollution in a cement kiln environment is disclosed. In this embodiment, the method includes treating a cement kiln exhaust gas stream with a treating fluid comprising a reagent containing a water soluble alkaline-earth metal polysulfide by injecting the treating fluid into the cement kiln exhaust gas stream prior to a particulate collection system.

Injecting the treating fluid, may include spraying droplets of the treating fluid into the cement kiln exhaust gas stream. The treating fluid may be injected into the cement kiln exhaust gas stream at a point where the cement kiln exhaust gas stream has a temperature of about 350 degrees Fahrenheit. The treating fluid may be injected into the cement kiln exhaust gas stream subsequent to a first particulate collection system and prior to a second particulate collection system. The treating fluid may also be injected into a gas resonance chamber or a duct carrying the cement kiln exhaust gas stream.

The treating fluid may also contain water and at least one of a surfactant and a hyperdispersant. The system and method may be adapted so that the droplets have a size which allows the droplets to have a minimum residence time of about 1 to about 2 seconds within the cement kiln exhaust stream. In some applications, this minimum residence time may be achieved when the droplets have an average size of about 20 microns or greater, and more particularly about 30 microns to about 40 microns. Longer residence times are likewise both achievable and suitable for cement kiln applications, as are larger droplet sizes.

In an illustrative embodiment, a system for treating cement kiln exhaust gas is disclosed. The system includes a treating fluid; at least one nozzle configured to communicate with a cement kiln exhaust gas stream from a kiln and to spray droplets of the treating fluid into the cement kiln exhaust gas stream; and at least one vessel fluidly connected to the nozzle and configured to store the treating fluid.

The nozzle may be configured to spray droplets having a size configured to allow the droplets to have a minimum residence time of about 1 to about 4 seconds. The nozzle may be configured to spray droplets having an average size of about 20 microns or greater.

The treating fluid may comprise a reagent containing a water soluble alkaline-earth metal polysulfide in water. The treating fluid may include the reagent combined with water. The treating fluid may also include at least one of a surfactant, a dispersant, and a hyperdispersant.

The treating fluid may consist essentially of a reagent containing a water soluble alkaline-earth metal sulfide and/or polysulfide. The treating fluid may consist essentially of water and a reagent containing a water soluble alkaline-earth metal sulfide and/or polysulfide. The treating fluid may consist essentially of a reagent containing a water soluble alkaline-earth metal sulfide and/or polysulfide, and at least one of a surfactant, a dispersant, and a hyperdispersant.

The treating fluid may consist of a reagent containing a water soluble alkaline-earth metal sulfide and/or polysulfide. The treating fluid may consist of water and a reagent containing a water soluble alkaline-earth metal sulfide and/or polysulfide. The treating fluid may consist of a reagent containing a water soluble alkaline-earth metal sulfide and/or polysulfide, and at least one of a surfactant, a dispersant, and a hyperdispersant.

In an illustrative embodiment, the 'treating fluid reacts with mercury within the cement kiln exhaust gas stream to form mercury sulfide. The mercury sulfide may no longer be soluble in terms of leachate in soils, cement or concrete as the captured mercury and other metals are now insoluble. The resulting particulates can be collected by a particulate collection system and transferred to storage for controlled metering back into a cement grinding mill and/or used as a filler material within a concrete batch plant, asphalt plant or landfilled.

Utilization of the systems and methods disclosed herein in the application of a cement kiln gas resonance chamber prior to the existing kiln baghouse or electrostatic precipitator may reduce investment cost and operating cost when contrasted with a wet scrubber, dry scrubber application or activated carbon injection.

In an illustrative embodiment, the application of an integrated duct system prior to an existing kiln baghouse or electrostatic precipitator may reduce investment cost and operating cost when contrasted with a wet scrubber, dry scrubber application or activated carbon injection. The application of the integrated duct system or gas resonance chamber after the existing kiln baghouse or electrostatic precipitator may reduce operating cost when contrasted with activated carbon injection.

These and other aspects of the disclosure may be understood more readily from the following description and the appended drawings.

BRIEF DESCRIPTION OF THE DRAWINGS

Embodiments of the disclosure are illustrated in the figures of the accompanying drawings which are meant to be exemplary and not limiting, in which like references are intended to refer to like or corresponding parts, and in which:

FIG. 13 illustrates a table of data collected through the use of the integrated injection system and method of FIGS. 5-12 for treating cement kiln exhaust gases to reduce pollution.

DETAILED DESCRIPTION

Detailed embodiments of the systems, methods, and apparatuses for cement kiln exhaust gas pollution reduction are disclosed herein; however, it is to be understood that the disclosed embodiments are merely exemplary of the systems, methods, and apparatuses, which may be embodied in various forms. Therefore, specific functional details disclosed herein are not to be interpreted as limiting, but merely as a basis for the claims and as a representative basis for teaching one skilled in the art to variously employ the systems, methods, and apparatuses for cement kiln exhaust gas pollution reduction.

The heavy metals, such as mercury, which are sought to be managed through the systems, methods, and apparatuses of the present disclosure are derived primarily from raw materials which are chemically altered during a clinker process releasing these materials into a cement kiln exhaust gas stream containing cement kiln dust, and to the atmosphere through a kiln baghouse, electrostatic precipitator (ESP), or other particulate collection system. These raw materials may include calcium, silica, iron and alumina derived primarily from various forms of limestone, clay, shale, slags, sand, mill scale, iron-rich material (IRM), pumice, bauxite, recycled glass, ashes, and similar materials.

Figure 1:
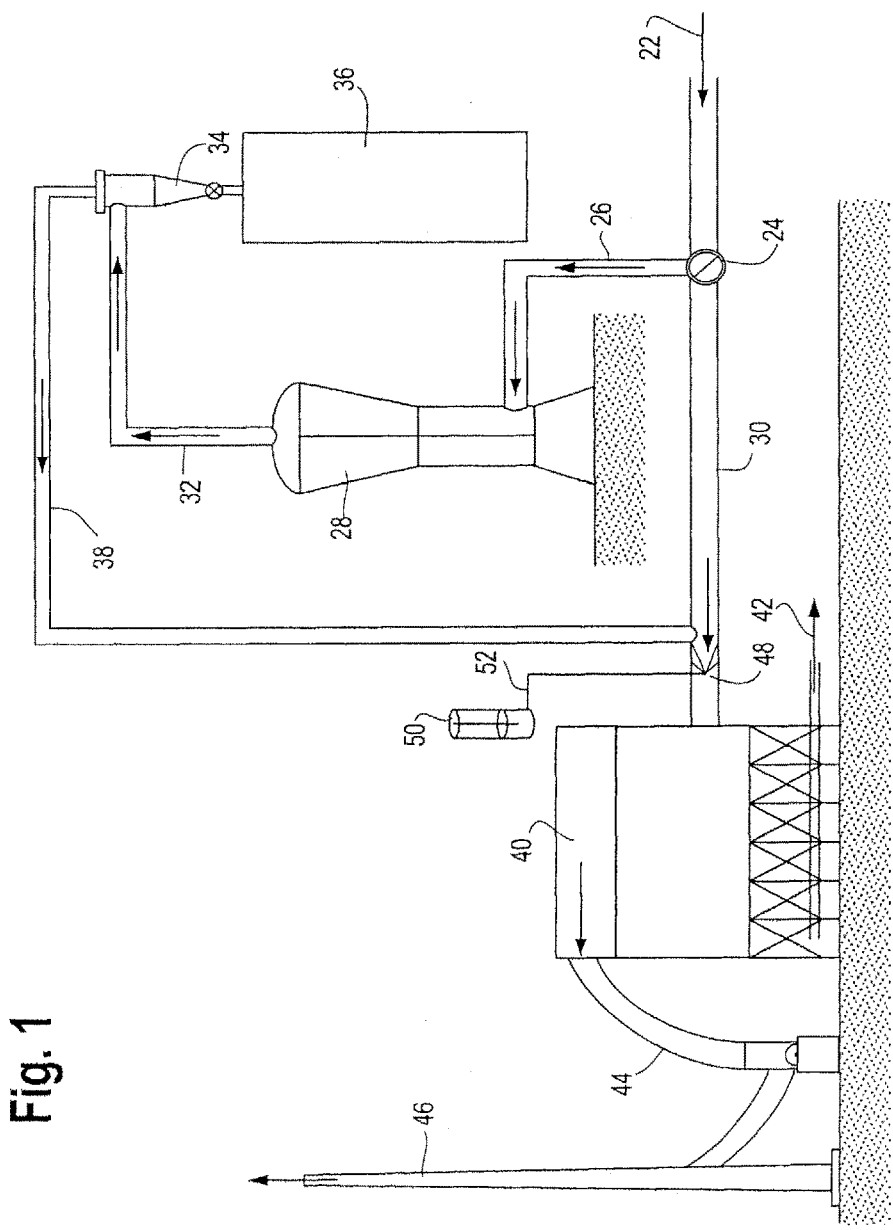
FIG. 1 illustrates an embodiment of a system and method for treating cement kiln exhaust gases to reduce pollution where the treating fluid is sprayed into a duct containing cement kiln dust.
Figure 2:
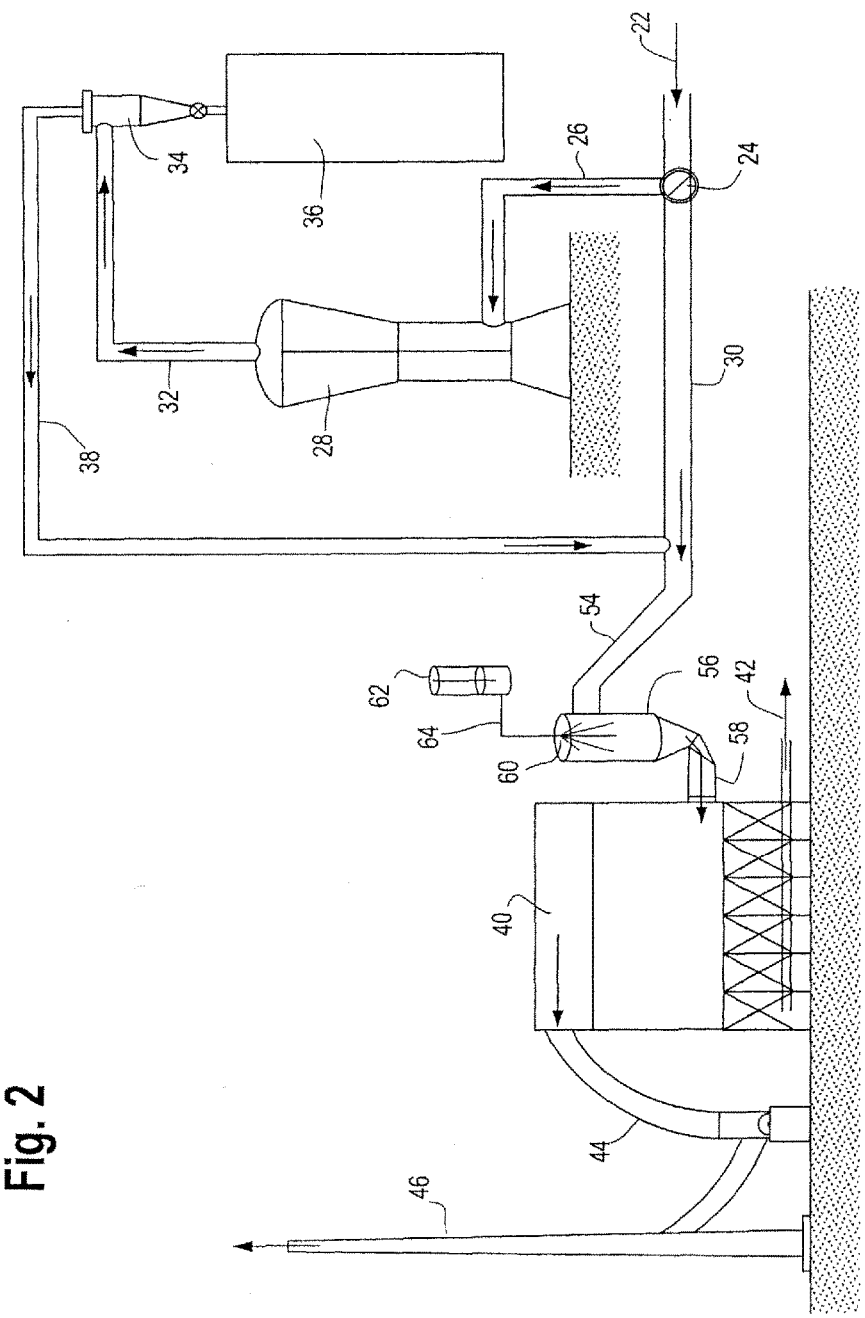
FIG. 2 illustrates an embodiment of a system and method for treating cement kiln exhaust gases to reduce pollution where the treating fluid is sprayed into a gas resonance chamber, cyclone, or additional duct containing cement kiln dust.
Figure 3:
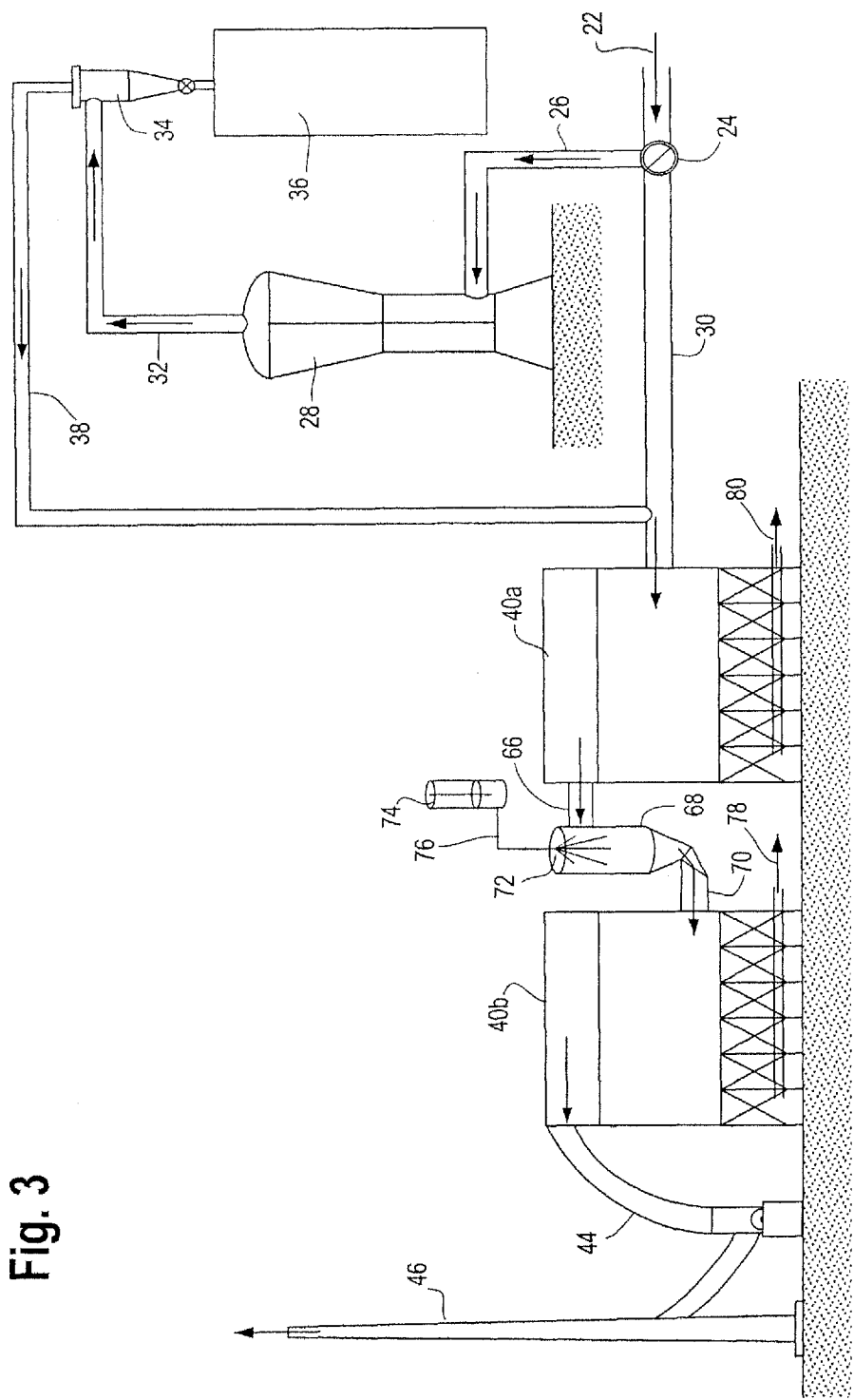
FIG. 3 illustrates an embodiment of a system and method for treating cement kiln exhaust gases to reduce pollution where the treating fluid is sprayed into a gas resonance chamber, cyclone, or additional duct between two particulate collection systems.

In one illustrative embodiment, cement kiln exhaust gases are typically passed from a kiln through one or more processes, ducts, mills, cyclones, particulate collection systems such as kiln bag houses, ESPs, or other particulate collection systems, and exit at a kiln exhaust stack. As illustrated in FIGS. 1-3, the cement kiln exhaust gas stream 22 containing cement kiln dust is passed from a kiln (not shown) to an exhaust gas diverter gate 24. At the diverter gate 24, all or a portion of the cement kiln exhaust gas stream 22 may be passed through a duct 26 and used for drying and heating within a raw mill 28, or passed through a bypass duct 30. As illustrated in FIGS. 1-3, when all or a portion of the cement kiln exhaust gas stream 22 is used for drying and heating within the raw mill 28, the cement kiln exhaust gas stream 22 passes through the raw mill 28 and a duct 32 to a raw mill cyclone or cyclone 34 located above a kiln feed silo 36. After the cement kiln exhaust gas stream 22 passes through the cyclone 34, the cement kiln exhaust gas stream 22 passes through a return duct 38, which connects with the bypass duct 30.

The cement kiln exhaust gas stream 22 in the bypass duct 30 may then pass through one or more particulate collection systems 40 during which particulates may be collected and used as a modified cement kiln dust (mCKD) 42. After the particulate collection system(s) 40, the cement kiln exhaust gas stream 22 passes through a duct 44 and exits through a kiln exhaust stack 46.

In an illustrative embodiment, the cement kiln exhaust gas stream 22 is treated with a fluid, solution, or treating fluid, by injecting or spraying the treating fluid into one or more ducts, chambers, or other process equipment carrying the cement kiln exhaust gas stream 22. The treating fluid may be provided in a fully soluble form enabling low cost application and retrofitting of existing facilities.

The treating fluid may contain a reagent containing an alkaline-earth metal sulfide and/or polysulfide. The alkaline-earth metal sulfide and/or polysulfide may have a pH of about 10 or more, and the treating fluid may have a pH of about 7 to 10 dependent upon the concentration of reagent in the treating fluid. In one embodiment, the reagent may contain the alkaline-earth metal sulfide and/or polysulfide typically at a concentration of about 20% to 40% in water. In another embodiment, the reagent may contain the alkaline-earth metal sulfide and/or polysulfide at higher concentrations in water, or, alternately, may be in a powder or solid form having a substantially higher percentage, or consisting entirely, of the alkaline-earth metal sulfide and/or polysulfide. The alkaline-earth metal sulfide/polysulfide may be added to another solid, powder, or liquid carrier to form the reagent.

In an illustrative embodiment, the reagent contains an alkaline-earth metal polysulfide in water. The alkaline-earth metal polysulfide may be either a magnesium or calcium polysulfide, and may be present in the reagent in an amount of about 25% to 35%, or about 25% to 30% in water. In another illustrative embodiment, the alkaline-earth metal polysulfide is a mixture of magnesium polysulfides and calcium polysulfides, wherein the polysulfides are present in the reagent in an amount of about 25% to 35%, or about 25% to 30% in water.

In an illustrative embodiment, the treating fluid contains the reagent and water. The treating fluid may contain the reagent and water in a ratio of about 1:1 to 1:10, in a ratio of about 1:3 to 1:6, and more particularly in a ratio of about 1:4. When the reagent contains the alkaline-earth metal sulfide and/or polysulfide at a concentration of about 20% to 40% in water, the resulting treating fluid may contain the alkaline-earth metal sulfide and/or polysulfide and water in ratios of about 1:4 to about 1:54, in a ratio of about 1:9 to 1:34, and more particularly in a ratio of about 1:11 to 1:24. Thus, the alkaline-earth metal sulfide and/or polysulfide may be present in the treating solution in an amount of about 1.8% to 11%. However, it should be appreciated that the ratios of reagent to water and/or the alkaline-earth metal sulfide and/or polysulfide to water can vary outside of the ranges listed above. In many applications, the economic goal may be to use as little of the reagent and/or the alkaline-earth metal sulfide and/or polysulfide as operationally possible. For example, the ratios used can vary dependent upon the particulate load and dispersion in the cement kiln exhaust gas stream, the exhaust gas stream velocity, the concentration of mercury and other metals in the cement kiln exhaust gas stream, and other parameters of the type.

The reagent and water may be combined into the treating fluid prior to injecting or spraying the treating fluid into the one or more ducts, chambers, or other process equipment carrying the cement kiln exhaust gas stream 22. For example, the reagent and water may be combined well in advance of (i.e. one or more hours, days, weeks, months, etc. in advance) or just prior to (i.e. one or more minutes prior to) injecting or spraying the treating fluid into the one or more ducts, chambers, or other process equipment.

Alternatively, the reagent and water may each be separately sprayed or injected into the one or more ducts, chambers, or other process equipment carrying the cement kiln exhaust gas stream 22 in a manner such that they intersect, combine, interact or coalesce in the one or more ducts, chambers, or other process equipment to form a solution or composition in situ, forming droplets of the solution or composition with the reagent reacting with the metal(s) in the cement kiln exhaust gas stream 22 for removal. In another variation, the treating fluid may be introduced to the cement kiln exhaust gas stream 22 by adding it to a conventional flue gas desulfurization solution that is sprayed into a duct.

The treating fluid may also contain one or more surfactants, dispersants, and/or hyperdispersants to assist in the removal of metal(s) from the cement kiln exhaust gas stream 22. In one embodiment, the surfactant, dispersant, and/or hyperdispersant is composed of one or more polyethylene oxide-polyethylene block co-polymers and/or the phosphate esters thereof. The addition of the surfactant, dispersant, and/or hyper dispersant to the treating fluid may be optional. When the surfactant, dispersant, and/or hyper dispersant is included, the surfactant, dispersant, and/or hyper dispersant may be provided in an amount sufficient to assist in maintaining the reaction agent or reagent in the treating fluid prior to reaction with the metal(s), for example in an amount of about 1% or less. According to the latter case, the surfactant, dispersant, and/or hyper dispersant is a polyethylene oxide-polyethylene block co-polymer and the phosphate esters thereof.

In an illustrative embodiment, the reagent, water, and the one or more surfactants, dispersants, and/or hyper dispersants may be combined into the treating fluid prior to injecting or spraying the treating fluid into the one or more ducts, chambers, or other process equipment carrying the cement kiln exhaust gas stream 22. For example, the reagent, water, and the one or more surfactants, dispersants, and/or hyper dispersants may be combined well in advance of (i.e. one or more hours, days, weeks, months, etc. in advance) or just prior to (i.e. one or more minutes prior to) injecting or spraying the treating fluid into the one or more ducts, chambers, or other process equipment.

In an illustrative embodiment, the treating fluid is sprayed or injected into the cement kiln exhaust gas stream 22. The treating fluid may be sprayed or injected into the cement kiln exhaust gas stream 22 through a gas resonance chamber or integrated into suitable ductwork prior to or after the cement kiln baghouse, electrostatic precipitator, or particulate collection system 40, and/or a flue gas desulfurization scrubber. The gas resonance chamber or ductwork is configured to form a zone which assists in bringing the particulate and the gas stream in the cement kiln exhaust gas stream 22 into contact with, and reacting with, the treating fluid. The treating fluid reacts with the gas laden with metals and cement kiln dust to form a particulate residue of the metals on and within the cement kiln dust (CKD). In one embodiment, the treating fluid reacts with mercury within the cement kiln exhaust gas stream 22 to form mercury sulfide.

Once the cement kiln exhaust gas stream 22 in the chamber or ductwork is acted upon by the treating fluid, the particulate residue is generally captured downstream, which, depending on the particular configuration, may be within the existing kiln baghouse, electrostatic precipitator, in a secondary polishing baghouse, or other particulate collection system 40. The captured particulate is typically a dry material referred to as modified cement kiln dust (mCKD). In the case of a cement kiln equipped with a flue gas desulfurization scrubber, a particulate residue may also be captured within the scrubber as a component of the generated synthetic gypsum resulting in modified synthetic gypsum (mSyngyp). The mCKD and/or the mSyngyp can then be transferred to storage for controlled metering back into a cement grinding mill and/or used as a filler material within a concrete batch plant, asphalt plant or landfilled as non-leachable mCKD and mSyngyp.

In an illustrative embodiment, the spray or injection timing of the treating fluid into the cement kiln exhaust gas stream 22 may be aligned with the operation of the raw mill 28, may be continuous, or may be intermittent, dependent upon the needs of the plant. In certain applications, the system for injecting the fluid (also referred to herein as the injection system) is operated when the exhaust is more likely to exceed applicable emission limits for the heavy metals being captured. For example, in certain applications, when the raw mill 28 is not operating, the exhaust gas may be more likely to include higher concentrations of heavy metals, and the injection system may be operated suitably at that time. Other cement kiln operations may require the injection system to operate while the raw mill 28 is also operating, depending on the cement making apparatus and process with which the injection system is associated, as well as the location of such injection system.

In an illustrative embodiment, the injection system for treating cement kiln exhaust gases includes a tank or other suitable vessel for storing the spray or treating fluid, and suitable fluid connections to the cement kiln exhaust gas stream to transport the fluid into operative proximity to the cement kiln exhaust gas stream containing mercury and other metals to be captured. The injection system includes one or more nozzles, ports, or other suitable openings positioned so that a spray fluid is formed. Multiple nozzles at spaced locations and with differing angular orientations generate a suitable dispersal pattern to contact the cement kiln exhaust gas stream.

A system and method for treating cement kiln exhaust gases to reduce pollution according to an illustrative embodiment is described with reference to FIG. 1. As illustrated in FIG. 1, the injection system includes one or more nozzles 48 integrated into the ductwork used to transport the cement kiln exhaust gas stream 22 from the kiln (not shown). In this illustrative embodiment, the nozzles 48 are integrated into a pre-existing duct. The nozzles 48 are suitably positioned to communicate with bypass duct 30. The nozzles 48 are connected to a vessel 50, for storing the spray or treating fluid, through one or more fluid connections 52, such as pipes and/or hoses. The treating fluid may be stored in the vessel 50 and transported through the fluid connections 52 to the cement kiln exhaust gas stream 22 in the bypass duct 30. The treating fluid can then be sprayed or injected into the exhaust gas stream 22.

In this embodiment, the nozzles 48 are positioned to communicate with bypass duct 30 downstream of the raw mill 28 and prior to the particulate collection system 40. Treatment by the injection system, illustrated in FIG. 1, occurs prior to the cement kiln exhaust gas stream 22 entering the one or more particulate collection systems 40. As such, the injection system may be designed such that the inlet temperature of the duct system is hot enough to accommodate the temperature drop across the injection system while in operation, while also meeting the operational requirements of the existing particulate collection system 40, baghouse, or ESP, such as an inlet temperature selected to avoid both high heat situations (for example above 400° F.) and low dew point situations (for example below 200° F.) which can lead to corrosion. It should be appreciated that the temperature drop across the injection system while in operation may depend on the inlet temperature, the amount of treating fluid being injected and other variables of the type.

In an illustrative embodiment, the treating fluid injected or sprayed through the nozzles 48 has a large enough droplet size allowing the treating fluid to intercept the cement kiln exhaust gas stream for a minimum of about 1-2 seconds either intermittently or on a continual basis while the treating fluid is being injected and the reaction occurs. However, it should be appreciated that longer residence times or interception times can be used and may be preferred based upon the particular application.

Treatment by the injection system, illustrated in FIG. 1, occurs prior to the cement kiln exhaust gas stream 22 entering the one or more particulate collection systems 40. As such, particulates are captured as a dry residual material resulting in the modified cement kiln dust (mCKD) 42. This mCKD 42 may no longer be soluble in terms of leachate in soils, cement or concrete as the captured mercury and other metals are now permanently insoluble. The mCKD 42 may be used as one of the additional materials inserted into a finish mill in the cement-making process, which is described in further detail below with reference to FIG. 4.

While, the injection system including nozzles 48 is integrated or installed in a preexisting duct, i.e. bypass duct 30, it should be appreciated that the injection system including nozzles 48 can be installed in one or more newly added, modified, or preexisting ducts at any number of different locations. For example, the injection system may be installed or placed to contact the cement kiln exhaust gas stream 22 upstream of the raw mill 28, downstream of the raw mill 28, in the bypass duct 30, in the return duct 38, downstream of the particulate collection system 40, upstream of the particulate collection system 40, or in one or more existing, modified, or additional ducts associated therewith.

When an injection system, similar to the integrated injection system illustrated in FIG. 1 is integrated or installed after, or downstream of, the particulate collection system 40, kiln baghouse or ESP, the injection system may be designed such that the inlet temperature of the injection zone is hot enough to accommodate the temperature drop across the injection zone while in operation while meeting the requirements of a secondary particulate collection system, such as illustrated in FIG. 3. This integrated injection system may be configured to spray droplets having a large enough droplet size to allow the droplets to intercept the cement kiln exhaust gas stream for about 1-2 seconds or longer, either intermittently or on a continual basis while the treating fluid is being injected and the reaction occurs. The resulting particulate may be carried directly into the secondary particulate collection system and contained as a concentrated residue. This residue may no longer be soluble in terms of leachate in soils, cement or concrete as the captured mercury and other metals are now permanently insoluble.

The ductwork associated with the injection system may be pre-existing or newly installed as part of the injection system. The ductwork associated with the injection system, whether pre-existing or new, may optionally be treated with a polymer or may require additional ducting, chambers, or other modifications to its geometry to insure the treating fluid or chemical remains in an active form for a length of time suitable to treat the cement kiln exhaust gas stream as intended before entering the particulate collection system.

In other embodiments, additional ductwork, chambers (such as gas resonance chambers), and/or modifications to the pre-existing ductwork may be used in creating a suitable treatment or injection system. Another system and method for treating cement kiln exhaust gases to reduce pollution according to an illustrative embodiment is described with reference to FIG. 2. As illustrated in FIG. 2, the injection system includes additional duct work and is installed or placed upstream of the particulate collection system 40. The additional ductwork includes a first duct 54, a resonance chamber or a cyclone 56, and a second duct 58. In this illustrative embodiment, the first duct 54 is connected to the bypass duct 30, the resonance chamber 56 is connected to the first duct 54, and the second duct 58 is connected to the resonance chamber 56 and to the inlet of the particulate collection system 40. Thus, the cement kiln exhaust gas stream 22 flows from the bypass duct 30 through the first duct 54, through the resonance chamber 56, and through the second duct 58 into the particulate collection system 40.

In addition to the additional ductwork, the injection system includes one or more nozzles 60 suitably positioned to communicate with the resonance chamber 56. In this illustrative embodiment, the nozzles 60 are connected to a vessel 62 for storing the spray or treating fluid through one or more fluid connections 64, such as pipes and/or hoses. The treating fluid it typically stored in the vessel 62 and transported through the fluid connections 64 to the cement kiln exhaust gas stream 22 in the resonance chamber 56. The treating fluid can then be sprayed or injected into the cement kiln exhaust gas stream 22.

In this embodiment, the nozzles 60 are positioned to communicate with resonance chamber 56 downstream of the raw mill 28 and prior to the particulate collection system 40. Treatment by the injection system, illustrated in FIG. 2, occurs prior to the cement kiln exhaust gas stream 22 entering the one or more particulate collection systems 40. Again, in this embodiment, the injection system may be designed such that the inlet temperature of the resonance chamber 56 is hot enough to accommodate the temperature drop across the resonance chamber 56 while in operation, while also meeting the operational requirements of the existing particulate collection system 40, baghouse, or ESP, such as an inlet temperature selected to avoid both high heat situations (for example above 400° F.) and low dew point situations (for example below 200° F.) which can lead to corrosion.

In an illustrative embodiment, the treating fluid injected or sprayed through the nozzles 60 has a large enough droplet size to allow the treating fluid to intercept the cement kiln exhaust gas stream for about 1-4 seconds or longer, either intermittently or on a continual basis while the reagents are being injected and the reaction occurs. However, it should be appreciated that longer residence times or interception times can be used and may be preferred based upon the particular application. As in the previous embodiments, particulates are captured as a dry residual material resulting in the modified cement kiln dust (mCKD) 42. The mCKD 42 may be used as one of the additional materials inserted into a finish mill in the cement-making process, which is described in further detail below with reference to FIG. 4.

Another system and method for treating cement kiln exhaust gases to reduce pollution according to an illustrative embodiment is described with reference to FIG. 3. As illustrated in FIG. 3, the injection system includes additional duct work and is installed or placed between two particulate collection systems 40a and 40b. The additional ductwork includes a first duct 66, a gas resonance chamber or a cyclone 68, and a second duct 70. In this illustrative embodiment, the first duct 66 is connected to the outlet of the particulate collection system 40a, the resonance chamber 68 is connected to the first duct 66, and the second duct 70 is connected to the resonance chamber 68 and to the inlet of the particulate collection system 40b. Thus, the cement kiln exhaust gas stream 22 flows from the particulate collection system 40a through the first duct 66, through the resonance chamber 68, and through the second duct 70 into the particulate collection system 40b.

As in the previous embodiments, the injection system includes one or more nozzles 72 suitably positioned to communicate with the resonance chamber 68. In this illustrative embodiment, the nozzles 72 are connected to a vessel 74 for storing the spray or treating fluid through one or more fluid connections 76, such as pipes and/or hoses. The treating fluid it typically stored in the vessel 74 and transported through the fluid connections 76 to the cement kiln exhaust gas stream 22 in the resonance chamber 68. The treating fluid can then be sprayed or injected into the exhaust gas stream 22.

In this embodiment, the nozzles 72 are positioned to communicate with the resonance chamber 68 downstream of the particulate collection system 40a and prior to the particulate collection system 40b. Treatment by the injection system, illustrated in FIG. 3, occurs after the particulate collection system 40a and prior to the particulate collection system 40b. In this embodiment, similar to the others, the injection system may be designed such that the inlet temperature of the resonance chamber 68 is hot enough to accommodate the temperature drop across the resonance chamber 68 while in operation, while also meeting the operational requirements of the particulate collection system 40b, baghouse, or ESP, such as an inlet temperature selected to avoid both high heat situations (for example above 400° F.) and low dew point situations (for example below 200° F.) which can lead to corrosion.

In this illustrative embodiment, similar to the others, the treating fluid injected or sprayed through the nozzles 72 has a large enough droplet size to allow the treating fluid to intercept the cement kiln exhaust gas stream for a minimum of about 1-4 seconds, either intermittently or on a continual basis while the reagents are being injected and the reaction occurs. However, it should be appreciated that longer residence times or interception times can be used and may be preferred based upon the particular application.

The resulting particulate may be carried directly into the particulate collection system 40b and contained as a concentrated residue 78. This residue 78 may no longer be a threat in terms of leachate in soils, cement or concrete as the captured mercury and other metals are now permanently insoluble. The residue 78 may be highly concentrated with heavy metals and may require additional testing for disposal or may use as a process addition within a cement mill. Additionally, the particulates captured by the particulate collection system 40a, (CKD 80) may be used alone or in combination with the residue 78 as one of the additional materials inserted into a finish mill in the cement-making process, which is described in further detail below with reference to FIG. 4.

While the systems described above have been installed at certain locations, it should be appreciated that the systems can be installed at any number of different locations. For example, the system may be installed or placed to contact the cement kiln exhaust gas stream upstream or downstream of the raw mill, upstream and/or downstream of one or more particulate collection systems, or between one or more existing ducts associated therewith. Treatment may thus be accomplished through any of a variety of pre-existing ducts, a gas resonance chamber, a dry scrubber, or through other suitable zones, either prior to or after the one or more particulate collection systems, including the cement kiln baghouse, electrostatic precipitator, or a flue gas desulfurization scrubber.

In the illustrative embodiments disclosed herein, the spray injection timing may be aligned with the operation of the raw mill 28 or may be continuous dependent upon the needs or goals of the plant to reduce emissions or comply with any applicable regulations. As shown in FIGS. 1 and 2, utilizing the injection system prior to the existing particulate collection system 40 may reduce investment cost and operating cost when contrasted with a wet scrubber, dry scrubber application or activated carbon injection.

It should be appreciated that in one or more of the embodiments disclosed herein there is no requirement for a 'Polishing Baghouse'. The injection system may be installed in-line with an existing kiln baghouse and the material collected may simply be segregated during periods when it is in operation. A separate dust storage and metering system may be included to hold the material until it can be put back into the finish mills on a controlled basis. The collected material can successfully be utilized as a process addition within the cement mills without any danger of releasing the captured mercury. Once the residual material is captured in concrete, it should not re-release as it is substantially permanently bound in its stable natural form, unlike what generally results from the use of activated carbon or sorbent technology. The captured mercury is contained in its stable natural form. It should not re-release into the air or leach into the soil unless it is physically processed again through a kiln or combustion system.

Any of the embodiments disclosed herein may include a dust storage and metering system for containment of the captured mCKD and re-introduction of the mCKD to the cement milling process to be used in further production steps or recycling of the mCKD back into the kiln process after removal of the entrained heavy metals such as mercury. The mCKD can be transferred directly to a storage silo for controlled metering back into a cement grinding mill, as a process addition, and/or used directly as a filler material within a concrete batch plant, asphalt plant or landfilled as non-leachable mCKD.

A method of recycling the mCKD and other raw materials according to an illustrative embodiment is described with reference to FIG. 4. A clinker 82 produced in the kiln is cooled and may be transferred to a storage silo 84 for controlled metering into one or more finish mills 86. Additionally, gypsum 88 may be transferred to a storage silo 90 for controlled metering into the finish mill 86. The gypsum 88 may be used as a process addition to the finish mill 86, replacing, for example, about 5.0% of the total raw materials being utilized. In an illustrative embodiment, the gypsum 88 is a modified synthetic gypsum (mSyngyp) captured by a flue gas desulfurization scrubber.

Figure 4:
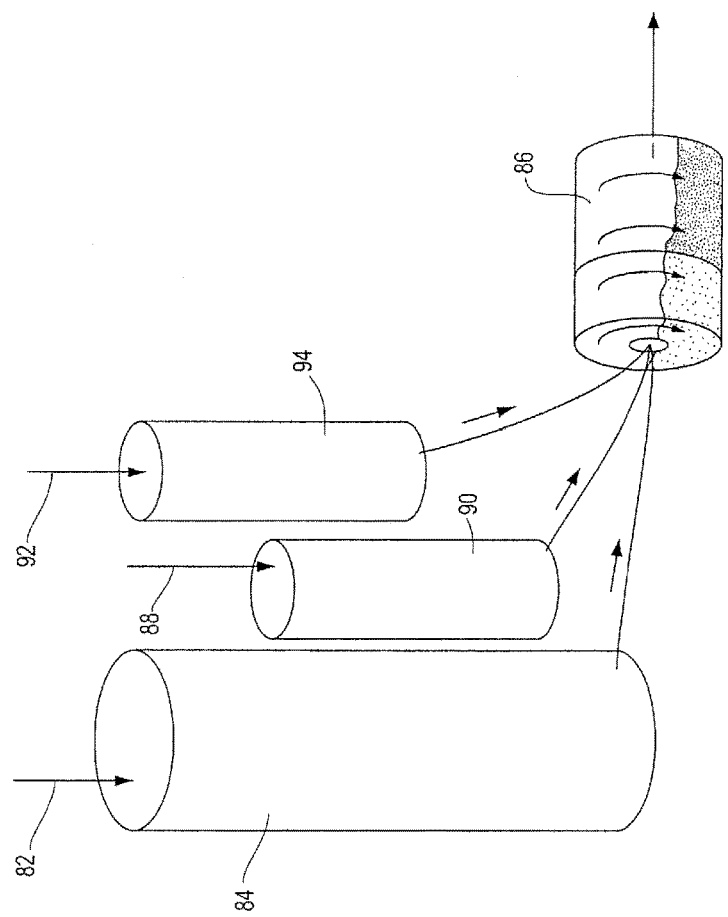
FIG. 4 illustrates an embodiment of a method of recycling modified cement kiln dust and other raw materials.

As illustrated in FIG. 4, a dust storage and metering system for containment of the captured mCKD 92 and re-introduction of the mCKD 92 to the cement milling process is included. The mCKD 92 can be transferred directly to a storage silo 94 for controlled metering into the finish mill 86, as a process addition. The mCKD 92 may be used as a process addition to a finish mill 86, replacing, for example, up to about 5.0% of the total raw materials being utilized. It should be appreciated that the mCKD may make up a larger or smaller percentage of the total materials as understood by those skilled in the art in view of the present disclosure.

The mCKD 92 is ultimately bound within the Portland cement and used as concrete, with the resultant material being stabilized and non-leachable. As illustrated in FIG. 4, a dust storage and metering system is used to hold the mCKD 92 until it can be put back into the finish mill 86 on a controlled basis. As described above, the mCKD 92 is substantially permanently bound in its stable natural form, as such; the collected mCKD 92 can successfully be utilized as a process addition within the cement mill without any danger of releasing the captured mercury.

Installation of the mCKD dust storage and metering system may allow the plant to effectively manage the mCKD material 92 and test it in advance of recycling, re-using or disposing.

In another illustrative embodiment, a continual emission monitoring system capable of accurately measuring mercury and other heavy metals for monitoring of system performance may be implemented as part of the system.

Figure 5:
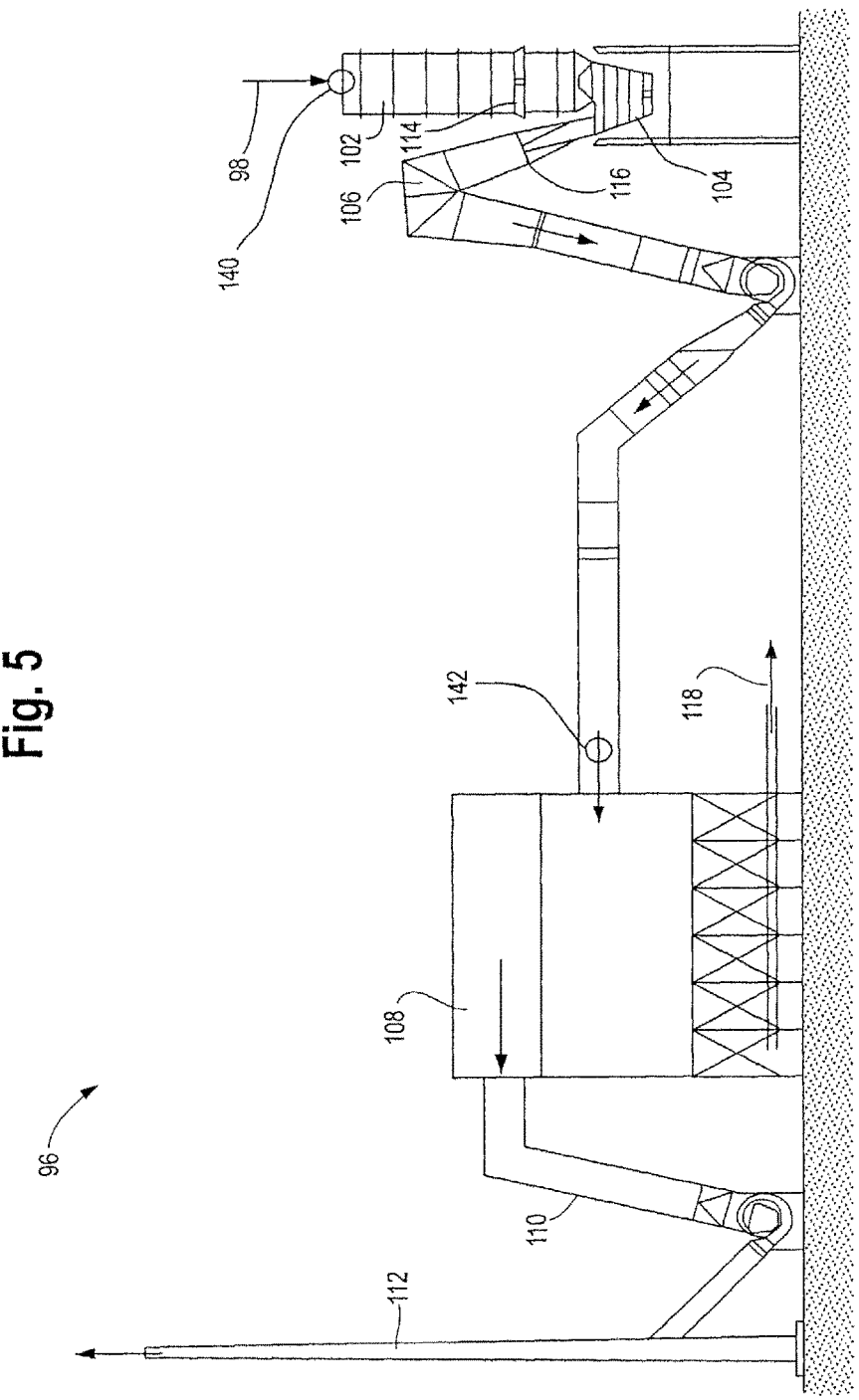
FIG. 5 illustrates an embodiment of an integrated injection system and method for treating cement kiln exhaust gases to reduce pollution.

An example of an integrated injection system according to an illustrative embodiment is described with reference to FIGS. 5-13. With reference to FIG. 5, the integrated injection system is installed in a cement plant 96. The plant 96 produces an exhaust gas stream 98 from a kiln (not shown), which flows from the kiln downstream through a downcomer duct 102. At the base of the downcomer duct 102 there is a drop out box 104, which is designed to allow any solidified material to fall out of the exhaust gas stream 98, separating it from the gases and particulate matter that continue through the ductwork. Connected to the outlet of the drop out box 104 is a duct 106, which carries the exhaust gas stream 98 downstream to a particulate collection system 108. The exhaust gas stream 98 flows through the particulate collection system 108 into a duct 110, which carries the exhaust gas stream 98 downstream to an exhaust stack 112 through which the exhaust gas stream 98 exits into the atmosphere.

Figure 6:
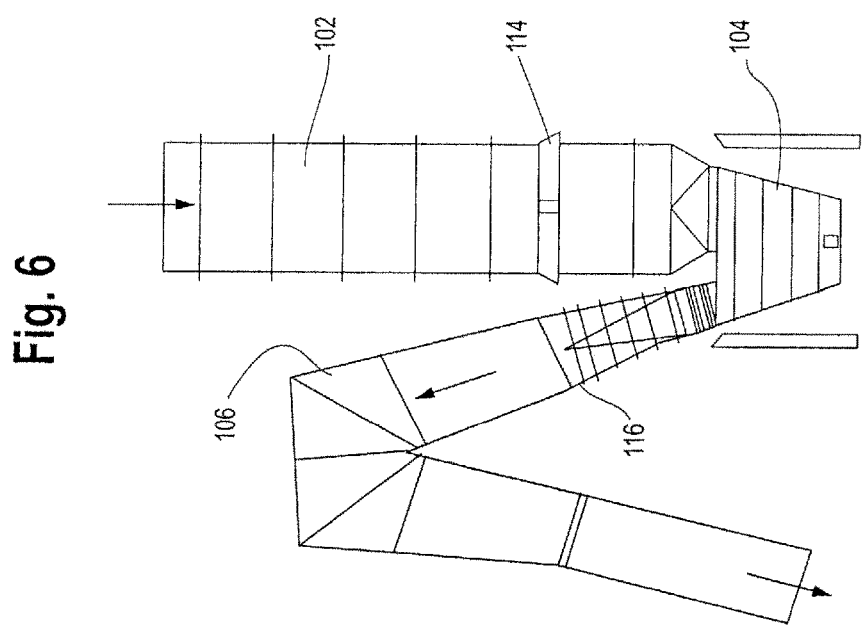
FIG. 6 illustrates an enlarged view of one portion of the system of FIG. 5 including two injection points.

Referring to FIGS. 5 and 6, the integrated injection system includes a first injection point 114 installed in the downcomer duct 102 and a second injection point 116 installed in the duct 106. The integrated injection system is located upstream of the particulate collection system 108. As such, and similar to the previously described embodiments, particulates are captured in the particulate collection system 108 as a dry residual material resulting in modified cement kiln dust (mCKD) 118. This mCKD 118 is no longer soluble in terms of leachate in soils, cement or concrete as the captured mercury and other metals are now permanently insoluble. Again, as in previous versions, the mCKD 118 may be used as one of the additional materials inserted into a finish mill in the cement-making process, such as described above with reference to FIG. 4.

Figure 7:
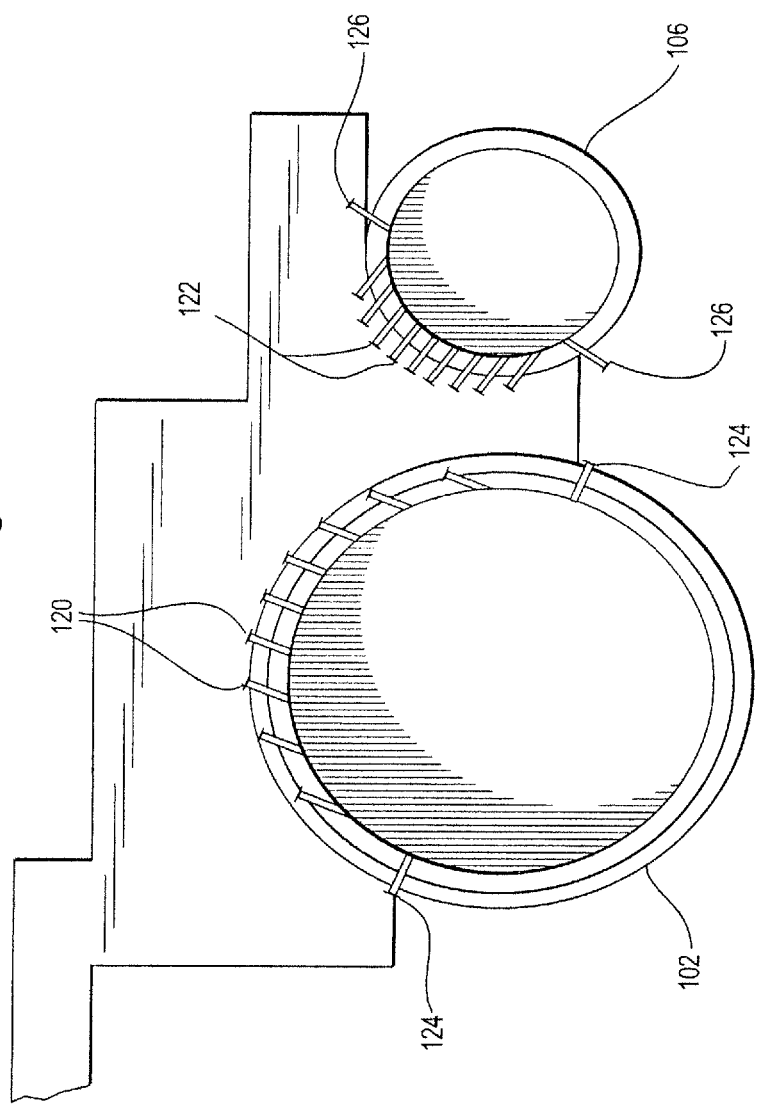
FIG. 7 illustrates a top sectional view of the two injection points of FIG. 6.

A schematic top down view of the first and second injection points 114 and 116 according to an illustrative embodiment is described with reference to FIG. 7. As illustrated in FIG. 7, first ports 120 are installed in the downcomer duct 102 at the first injection point 114, and second ports 122 are installed in the duct 106 at the second injection point 116. As illustrated, the downcomer duct 102 has a diameter of about twenty (20) feet and there are nine (9) first ports 120 around the circumference of the downcomer duct 102. The duct 106 has a diameter of about eleven and a half (11.5) feet and there are nine (9) second ports 122 around the circumference of the duct 106. However, it should be appreciated that the number of first ports 120 and the number of second ports 122 may be smaller or larger than nine (9), dependent upon the particular application and sizes of the ducts.

Referring now to FIGS. 7-11, first ports 120 and second ports 122 are four inches in diameter, and installed at radially spaced locations around the circumference of downcomer duct 102 and the duct 106, respectively. The ports are aligned in parallel to each other. Depending on the particular application, it should be appreciated that the ports 120, 122 may be smaller or larger than four inches in diameter, ports 120 need not be of the same dimension as ports 122, and the spacing and orientation may be varied. The ports 120, 122 are designed to penetrate the sidewall of the downcomer ducts 102, 106 for insertion of lances 128*a-r* of spray nozzles into the downcomer ducts 102, 106 as discussed below.

In this illustrative embodiment, lances having one or more nozzles positioned thereon inserted into corresponding ones of the ports 120, 122. Each of the ports 120, 122 can hold a lance. However, it should be appreciated that not all of the ports 120, 122 are required to have a corresponding lance inserted therein during operation. The lances may have a length that allows the lance to extend from the particular port into which the lance is received across at least a portion of the duct. It should be appreciated that the lances may have differing lengths and may extend varying distances across the duct. For example, the lances may extend substantially across the duct from corresponding ports, or may be sized or otherwise configured to extend a portion of the way across the duct from such ports.

Figure 9:
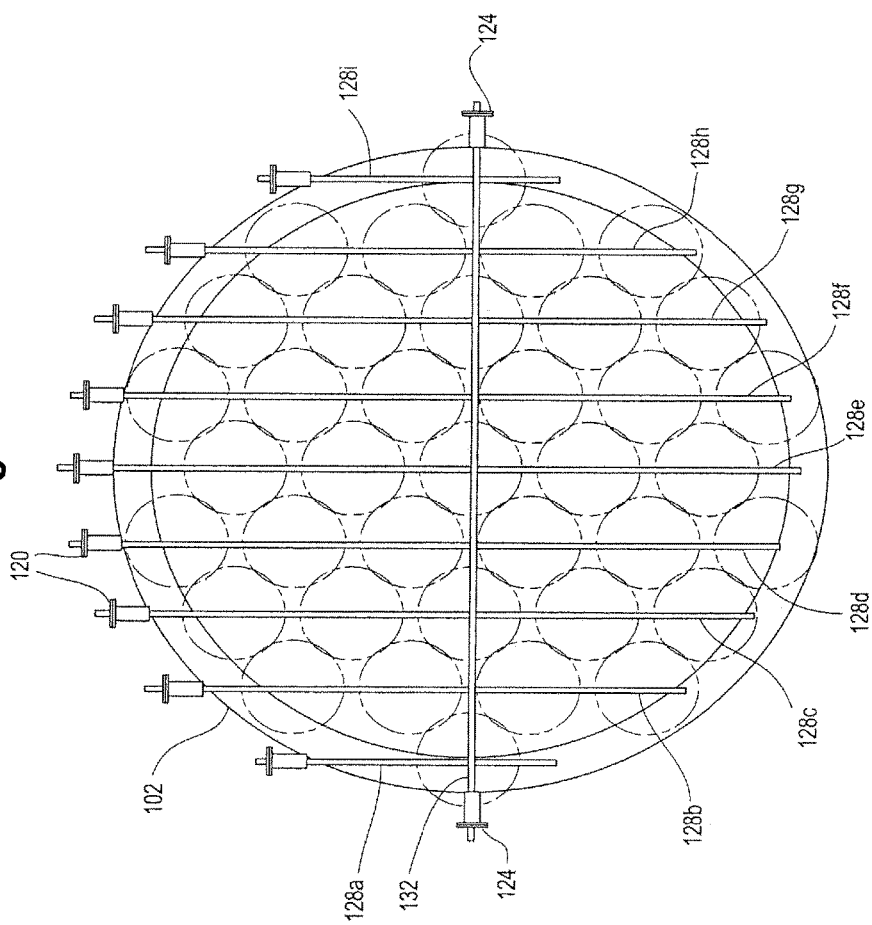
FIG. 9 illustrates a schematic view of an embodiment of a spray pattern from the nozzles at one injection point of the system of FIGS. 5-8.
Figure 11:
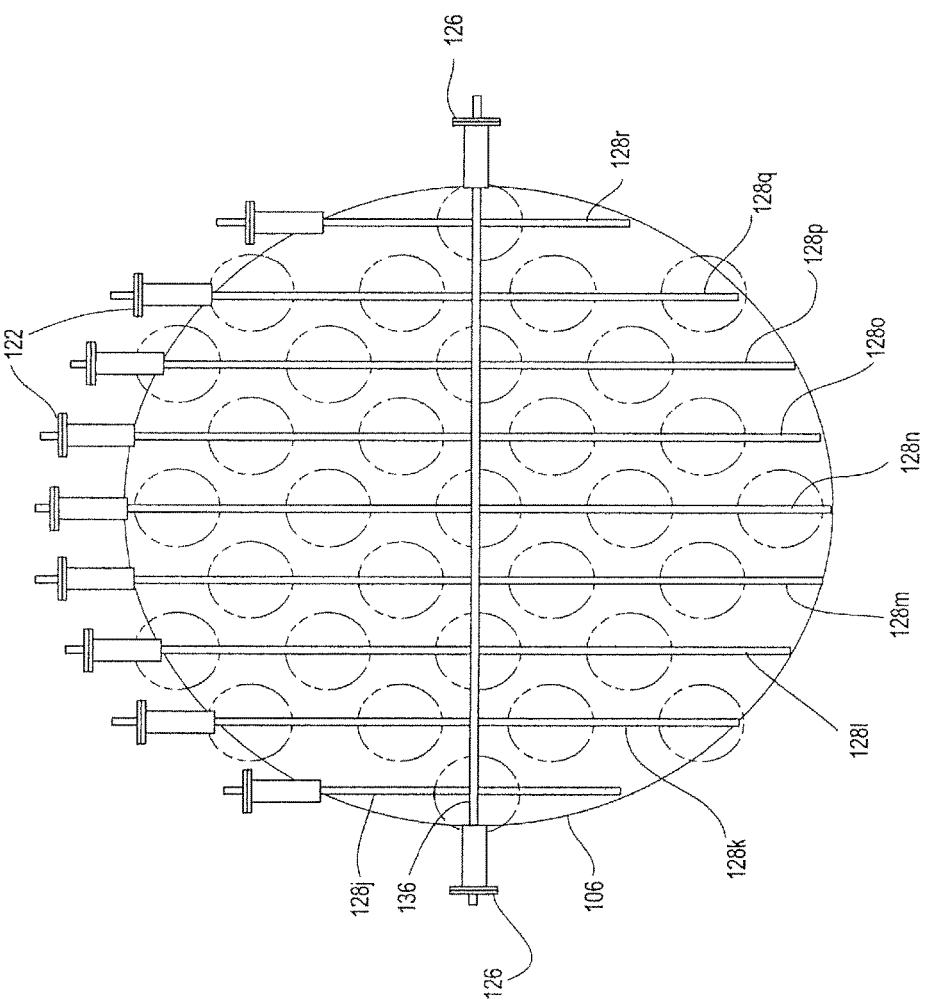
FIG. 11 illustrates a schematic view of an embodiment of a spray pattern through the nozzles at another injection point of the system of FIGS. 5-8.
Figure 12:
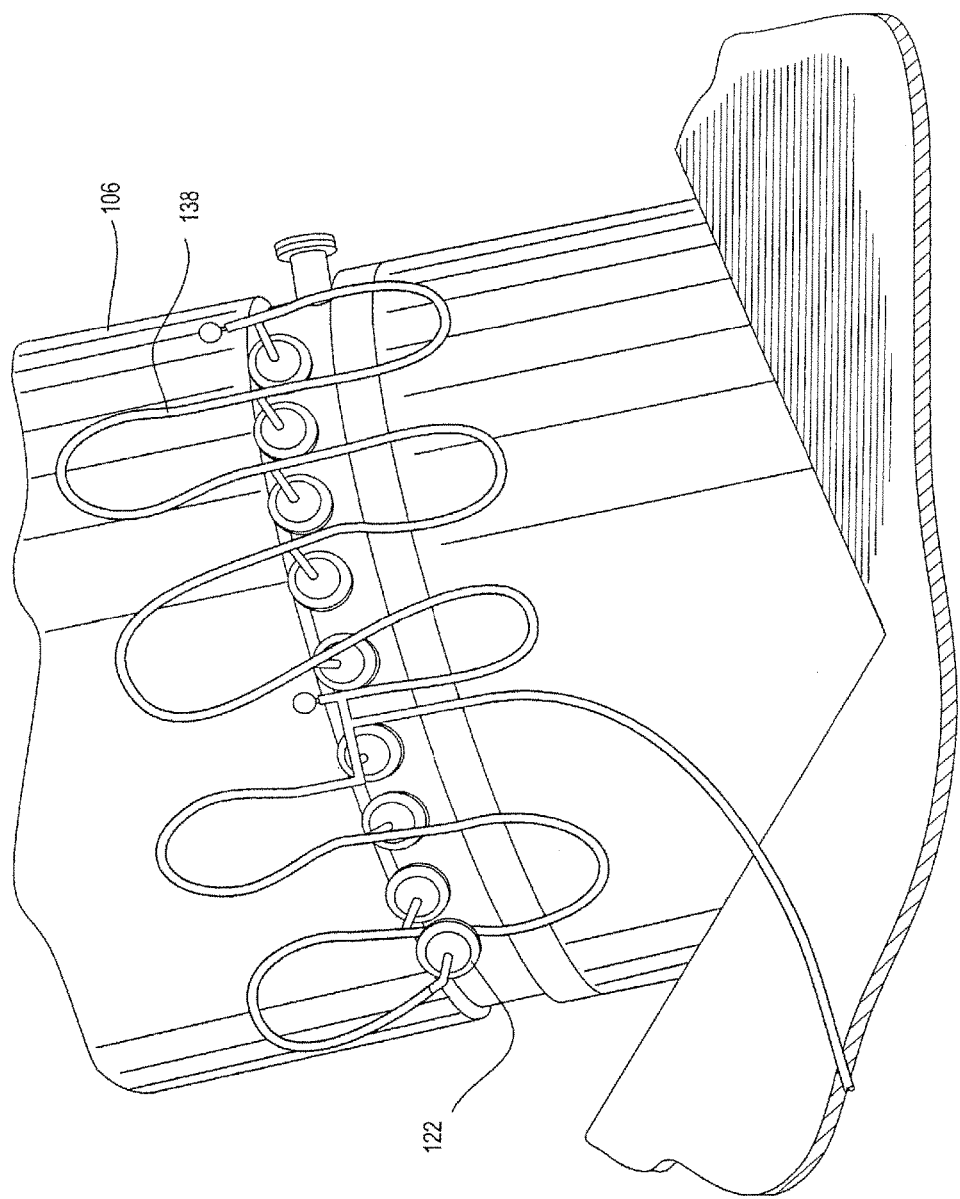
FIG. 12 illustrates an embodiment of fluid connections the injection point of the system of FIG. 11.

As seen in FIGS. 7, 9, and 11, cross supports 132 and 136, fitted with saddles for each lance (not shown), may extend below and across the lances of a corresponding duct and engage the underside or topside of such lances to support them. The cross supports 132 and 136 extend at an angle (perpendicular in this version) to corresponding lances and is mounted through corresponding ports 124, 126.

Figure 8:
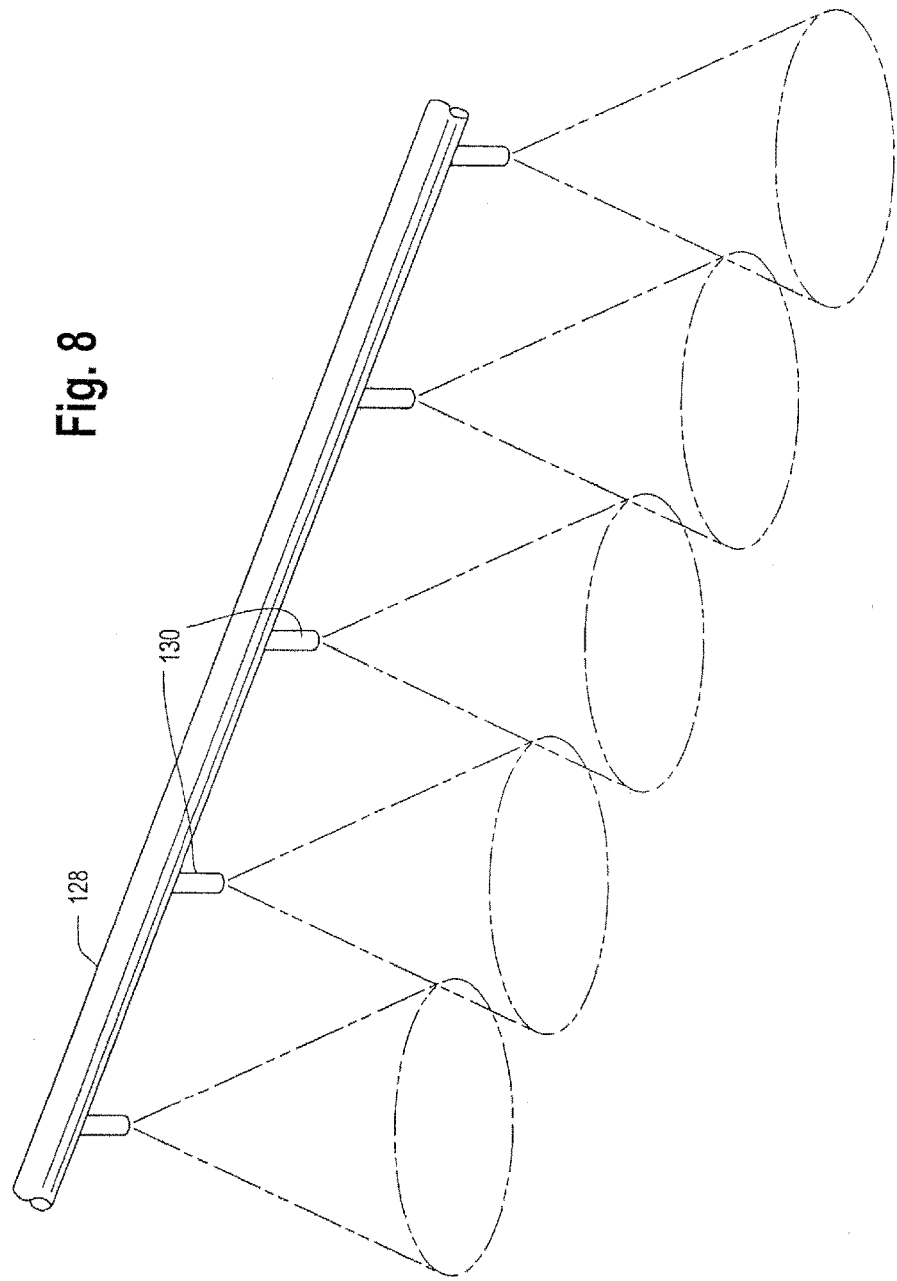
FIG. 8 illustrates an embodiment of a lance suitable for use in the various embodiments of this disclosure, including the systems of FIGS. 5-7.

An embodiment of one of lances 128*a-r* according to an illustrative embodiment is further described with reference to FIG. 8. As illustrated in FIG. 8, a lance 128, such as one of lances 128*a-r* described below, has one or more nozzles 130 installed thereon. In this embodiment the lance 128 is made of stainless steel. However, it should be appreciated that the lance 128 may be made of other materials, such as but not limited to iron, aluminum, polymers, and other materials of the type. In this embodiment, the nozzles 130 are configured to disperse droplets of the treating fluid. The droplet size should be large enough to allow the droplets to exist long enough and react with the metal(s), such as ionic and elemental mercury, within the exhaust gas stream. In this embodiment, the droplets may have an average size of about 20-40 microns, and more particularly an average size of about 30-40 microns. The droplet size of about 30-40 microns is designed allow the droplets to reside in the exhaust gas stream for a minimum of about 1-2 seconds when the temperature at the injection point is on average about 350° F. However, the droplet sizes can be made to vary, for example the droplets may have an average size of about 20 microns or larger, dependent upon the exhaust gas temperature, treating fluid concentration, water pressure, actual cubic feet per minute, particulate dust load and mercury concentrations, and other factors. For example, it should be appreciated that a higher temperature may be associated with a larger droplet size, such as about 70 to 90 microns (though this is not an upper limit on suitable droplet size), and a lower temperature may allow for a smaller droplet size to be used.

A schematic view of a spray pattern through the nozzles 130 within the downcomer duct 102 at injection point 114 is illustrated and described with reference to FIG. 9. As illustrated in FIG. 9, there are nine (9) lances 128*a-i*, equally spaced, each having one or more nozzles 130 (as indicated by the circular patterns) and inserted into nine of the first ports 120. In this embodiment, the lances 128*a-i* are supported by the cross support 132 that extends between ports 124. The cross support 132 may be fitted with saddles for the lances 128*a-i* to support the lances 128*a-i* as the lances 128*a-i* extend across the duct 102.

As illustrated in FIG. 9, the nozzles 130 (as indicated by the circular patterns) have a cone-shaped spray pattern with a round shaped impact area. However, it should be appreciated that nozzles having differing shaped spray patterns and impact areas may be used.

In this embodiment, the lances 128*a* and 128*i* each have one (1) nozzle 130, the lances 128*b* and 128*h* each have four (4) nozzles 130, the lances 128*a*, 128*c*, and 128*g* each have five (5) nozzles 130, and the lances 128*d* and 128*f* each have six (6) nozzles 130. The spray patterns, illustrated by the circular patterns, of the nozzles 130 cover about 90% of the total cross sectional area of the downcomer duct 102. However, it should be appreciated that a different arrangement or number of nozzles, smaller, larger, or different spray patterns may be used, and that the amount of coverage of the total cross sectional area of the downcomer duct 102 may be varied so as to be a higher or smaller percentage.

Similarly, a schematic view of a spray pattern through the nozzles 130 within the duct 106 at injection point 116 is illustrated and described with reference to FIG. 11. As illustrated in FIG. 11, there are nine (9) lances 128*j-r*, equally spaced, each having one or more nozzles 130 (as indicated by the circular patterns) and inserted into nine of the second ports 122. In this embodiment, the lances 128*j-r* are supported by the cross support 136 that extends between ports 126. The cross support 136 may be fitted with saddles for the lances 128*j-r* to support the lances 128*j-r* as the lances 128*j-r* extend across the duct 106.

As illustrated in FIG. 11, the nozzles 130 (as indicated by the circular patterns) have a cone-shaped spray pattern with a round shaped impact area. However, it should be appreciated that nozzles having differing shaped spray patterns and impact areas may be used.

In this embodiment, the lances 128j and 128r each have one (1) nozzle 130, the lances 128k-m and 1280-q each have four (4) nozzles 130, and the lance 128n has five (5) nozzles 130. The spray patterns, illustrated by the circular patterns, of the nozzles 130 cover about 90% of the total cross sectional area of the duct 106. However, it should be appreciated that any number of nozzles having smaller or larger spray patterns may be used to cover a higher or smaller percentage of the total cross sectional area of the duct 106.

Figure 10:
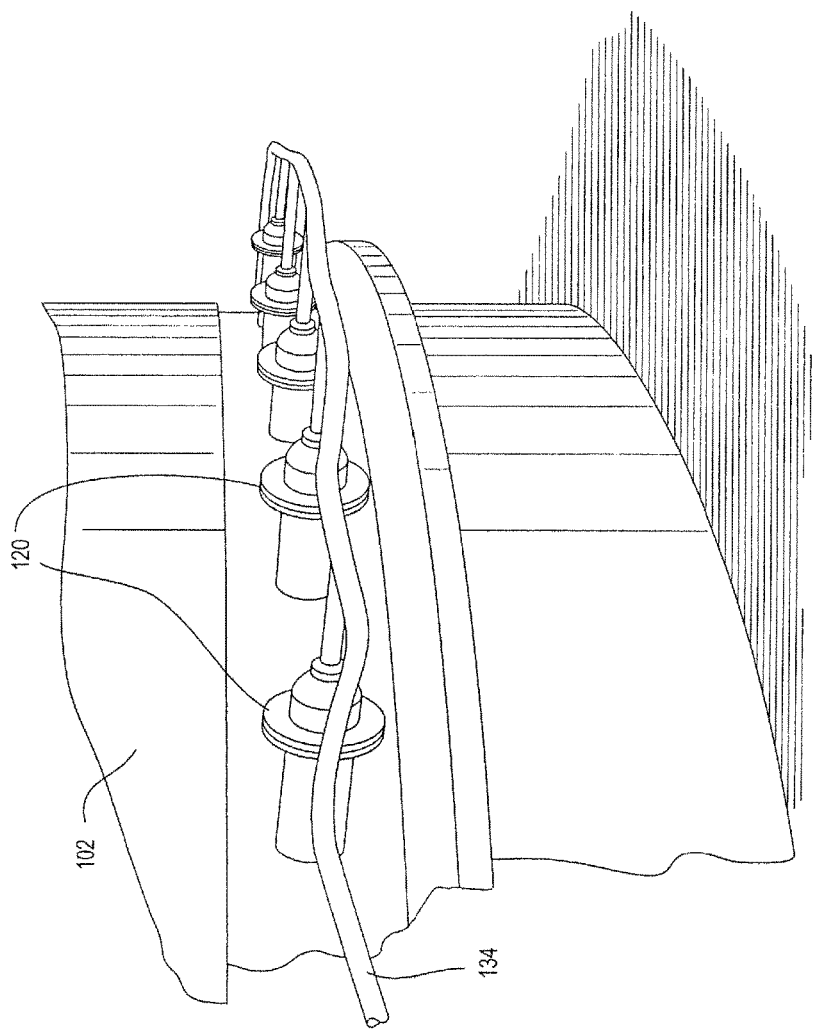
FIG. 10 illustrates an embodiment of fluid connections at the injection point of the system of FIG. 9.

As illustrated, with reference to FIGS. 8-10, the nozzles 130 are fluidly connected to one or more vessels for storing the treating fluid, via one or more of the lances 128a-i, through one or more fluid connections 134, such as pipes and/or hoses. The treating fluid is stored in the vessel and transported (for example via a pump) through the fluid connections 134, through the one or more lances 128a-i and exits through the nozzles 130 within the downcomer duct 102. The treating fluid then contacts the cement kiln exhaust gas stream 98 within the downcomer duct 102. Similarly, as illustrated with reference to FIGS. 8, 11, and 12, the nozzles 130 on the lances 128j-r at the second injection point 116 in the duct 106 are fluidly connected to a vessel, containing treating fluid, via one or more fluid connections 138, such as pipes and/or hoses.

The integrated injection system, described above with reference to FIGS. 5-12, can be implemented in cement plant 96 (FIG. 5) to remove mercury from exhaust gas stream 98. The temperature of the exhaust gas stream 98 varies dependent upon operation of an inline raw mill and/or the kiln conditions. In this illustrative embodiment, the temperature at the inlet to the downcomer duct 102, which is upstream of the raw mill, varies from about 600 to 800° F. Temperatures at the inlet to the particulate collection system 108 typically range from about 240-300° F. to protect the particulate collection system 108. When the raw mill is operating, the exhaust gas stream 98 loses heat as it passes through the raw mill to dry out the raw materials while grinding is taking place. When the raw mill is not operating, it is generally necessary to lower the temperature of the exhaust gas stream 98 by using a high pressure water spray in the downcomer duct 102. This typically cools the exhaust gas stream 98 down to about 325-395° F. at the inlet to the particulate collection system 108 to protect the particulate collection system 108.

The particulate loading of exhaust gas stream 98 can be as high as 20 tons per hour (tph) through the downcomer duct 102 and is not dependent on raw mill operation. The exhaust gas stream 98 gas volume can vary by 4,000,000 standard cubic feet per hour (sal) during operation due to temperature fluctuations and process conditions.

In this embodiment, the treating fluid contains a reagent and water. The reagent is 30% calcium polysulfide in water. The reagent and water is injected in a ratio of about 1:4 when the raw mill is off and the temperature is reduced to about 350° F. at the exit of the duct 106. As described above, the first injection point 114 is installed in the downcomer duct 102, prior to the drop out box 104, and the second injection point is installed in the duct 106, after the drop out box 104. The treating fluid is injected through the nozzles 130 at a rate of about fifteen (15) gallons per minute, a pressure of about 45 psi, and has an average droplet size of about 30-40 microns. The droplet size of about 30-40 microns is designed to allow the reagent to reside in the exhaust gas stream 98 long enough to come into contact with and react with the ionic and elemental mercury within the exhaust gas stream 98 to form mercury sulfide. In this embodiment, the 30-40 micron droplets reside for a minimum of about 1-2 seconds within the exhaust gas stream 98 having a temperature of about 350° F., on average, before evaporating. Additionally, the 30-40 micron droplets prevent the reagent from building up on a downstream preheater ID fan (not shown) that is present in the cement plant 96. Under these conditions, a smaller droplet may not provide the droplet enough life to allow the reaction to occur, and a larger droplet may carry to the preheater ID fan where it may contribute to buildup and vibration leading to fan failure.

A table of exemplary injection runs and corresponding results is illustrated and described with reference to FIGS. 5 and 13. As illustrated in FIG. 13, six runs were conducted. The amount of mercury that was captured through use of the integrated injection system was calculated based on measurements taken at a first measurement point 140 located prior to the first injection point 114 and a second measurement point 142 located prior to the inlet of the particulate collection system 108, as illustrated in FIG. 5.

During runs 1 and 2, the treating fluid was not injected and the amount of mercury present in the exhaust gas stream 98 at the second measurement point was 512.6 ug/m and 532.3 ug/m, respectively. During runs 3 and 4, the treating fluid was injected at only one of the injection points, namely the first injection point 114. The treating fluid was the reagent water mixture containing the reagent and the water in a ratio of about 1:4. The treating fluid was injected at only one of the injection points, the first injection point 114 at a rate of about fifteen (15) gallons per minute (GPM) for about thirty (30) minutes. The treating fluid was injected on a continual basis allowing the reagent to intercept the exhaust gas stream 98 for a minimum of about 1-2 seconds, during which the reaction occurs. The average total amount of mercury (i.e. the amount in the particulate and vapor) in the exhaust gas stream 98 at the first measurement point 140 (before any treatment) was determined to be about 480 ug/m during runs 3 and 4. The average total amount of mercury in the exhaust gas stream 98 at the second measurement point 142 (after treatment) was determined to be about 281.8 ug/m 3 and about 326.6 ug/m 3 during runs 3 and 4, respectively. When comparing mercury levels before and after treatment at a single location along the path of the exhaust gases, during the same runs, run 3 achieved a capture rate of about 41.3% of the total mercury in the exhaust gas stream 98, and run 4 achieved a capture rate of about 32% of the total mercury in the exhaust gas stream 98. Thus, injection of the treating fluid at the first injection point 114 was measured to achieve an average capture rate of about 36.7% of the total mercury in the exhaust gas stream 98 across runs 3 and 4.

The mercury capture rate is even higher when comparing the untreated exhaust gas stream at the second measurement point 142 from runs 1 and 2 to the treated stream at the same measurement point 142 from runs 3 and 4. Specifically, average total mercury at the second measurement point 142 in runs 1 and 2 was 522 ug/m and in runs 3 and 4 was 304 ug/m, representing a capture rate of about 42%.

During runs 5 and 6, the treating fluid was injected through both the first injection point 114 and the second injection point 116. The treating fluid was the reagent water mixture containing the reagent and the water in a ratio of about 1:4. The treating fluid was injected at a rate of about fifteen (15) gallons per minute (GPM) for about fifteen (15) minutes through both injection points 114 and 116. The treating fluid was injected through both injection points 114 and 116 on a continual basis allowing the reagent to intercept the exhaust gas stream 98 for a minimum of about 1-2 seconds at each point, during which the treatment occurs. The average total amount of mercury (i.e. the amount in the particulate and vapor phase) in the exhaust gas stream 98 at the first measurement point 140 was determined to be about 497 ug/m and 475 ug/m during runs 5 and 6, respectively. The average total amount of mercury in the exhaust gas stream 98 at the second measurement point 142 was determined to be about 203.5 ug/m and about 223.3 ug/m during runs 5 and 6, respectively. Run 5 achieved a capture rate of about 59% of the total mercury in the exhaust gas stream 98, and run 6 achieved a capture rate of about 52.9% of the total mercury in the exhaust gas stream 98. Thus, injection of the treating fluid at both of the injection points 114 and 116 can achieve a capture rate of about 56% of the total mercury and a capture rate of about 66% of the amount of mercury in the vapor of the exhaust gas stream 98.

Again, the mercury capture rate is even higher when comparing the exhaust gas treated in runs 5 and 6 at measurement point 142 to the untreated exhaust gas from runs 1 and 2, all of which involved about the same rate of kiln feed. Specifically, average total mercury at point 142 in untreated runs 1 and 2 was 522 ug/m, compared to average total mercury of 213 ug/m in runs 5 and 6, representing a capture rate of about 59% of the total mercury.

In the runs described above, treatment by the integrated injection system illustrated in FIGS. 5-12, occurs prior to the exhaust gas stream 98 entering the particulate collection system 108. The treating fluid was injected on a continual basis allowing the reagent to intercept the exhaust gas stream 98, for a minimum of about 1-2 seconds, during which the reaction occurs. During the reaction, the reagent interacts with elemental and ionic mercury in the exhaust gas stream 98 converting the elemental and ionic mercury into mercury sulfide. As such, the particulates (including mercury sulfide) are carried into the particulate collection system 108. The particulates are captured as a dry residual material resulting in the modified cement kiln dust (mCKD) 118, as illustrated in FIG. 5. The mCKD 118 may no longer be soluble in terms of leachate in soils, cement or concrete as the captured mercury and other metals are now permanently insoluble. The mCKD 118 may be used as one of the additional materials inserted into a finish mill in the cement-making process, such as described above with reference to FIG. 4.

Although the runs described above were conducted with the raw mill off, it should be appreciated that the systems and methods described herein can be utilized to remove mercury and other metal(s) when the raw mill is on, or under any number of other operating protocols. When the raw mill is off, the mercury content is generally expected to be higher than when the raw mill is on. Thus, it is expected that the above-described treating fluid processes will cause an even larger percentage of mercury to be removed from the exhaust gas stream when the raw mill is on.

While the systems and methods disclosed herein are described with reference to certain embodiments, it should be appreciated that cement kiln configurations may vary greatly and thus locations and configurations of the treatment system relative to the kiln exhaust gas stream may be correspondingly varied to suit the particular cement kiln. It should also be appreciated that any of the embodiments contemplated herein may or may not require one or more secondary particulate removal systems, depending on the particular applications.

Depending on the individual kiln operation, raw materials, and fuels, the systems disclosed herein may run only intermittently, on an as needed basis, or they may run substantially continually to achieve desired reduction goals, including the injection of treating fluid 100% of the time. In most cases, the highest period of mercury emission relates to when the in-line vertical mill or raw mill is off or when there is a temperature discrepancy in the kiln baghouse, ESP, or other particulate collection system. Accordingly, the treatment process may be configured to run during such off-line periods, or it may be triggered to run in response to any number of parameters, such as time, the exceeding of certain emission thresholds, running emission averages, measurements of gas constituents, and other parameters of the type. Each system may be tailored to each cement kiln based on actual emission modeling, raw materials, costs, and any number of other operational, emission, or functional parameters.

In an illustrative embodiment, the duct(s), chambers, or other treatment zones associated with the treatment system are configured to address temperature drops as the exhaust stream travels downstream. For example, as disclosed above, in certain embodiments, the treatment zone (duct, chamber, cyclone, etc.) may be selected or configured so that the inlet temperature of the treatment zone is hot enough to accommodate the temperature drop across the zone while in operation, while meeting the operational requirements of a downstream baghouse, ESP, or other particulate collection system. Such an inlet temperature avoids both high heat situations and low dew point situations which lead to corrosion.

The systems, methods, and processes disclosed herein have been identified, adapted to, and designed for the cement industry. In one form, the systems, methods, and processes disclosed herein may provide a lower capital cost, lower operating cost, and most importantly reduced mercury emission levels.

It should be appreciated that a version of this technology can also be applied to cement-making plants equipped with a wet scrubber or already designed for use of activated carbon injection. Retrofitting of existing facilities is expressly among the possible configurations.

It should also be understood that, using the systems and methods disclosed herein, mercury is captured regardless of where it is generated during the cement-making process, without the need for re-heating. The systems and methods disclosed herein may allow the cement plants to use a greater variety of raw materials without fear of exceeding any applicable emission limits for mercury or other heavy metals captured as described in this disclosure. Depending on the volume of residual material generated, the portion which cannot be utilized as a process addition will have to be disposed of, but this is expected to be a minor volume in the overall context.

While the above description relates generally to mercury capture, it should be appreciated that the systems, methods, processes, and technology disclosed herein may be modified to capture hexavalent chromium and a variety of other metals and emission hot points.

The matter set forth in the foregoing description and accompanying drawings is offered by way of illustration only and not as a limitation. While the systems, methods, and apparatuses for cement kiln exhaust gas pollution reduction have been described and illustrated in connection with certain embodiments, many variations and modifications will be evident to those skilled in the art and may be made without departing from the spirit and scope of the disclosure. The disclosure is thus not to be limited to the precise details of methodology or construction set forth above as such variations and modification are intended to be included within the scope of the disclosure.

The invention claimed is:

1. A system for reducing pollution in a material processing environment comprising:
 a treating fluid comprising a reagent containing a water soluble alkaline-earth metal sulfide;
 at least one nozzle configured to communicate with a cement kiln exhaust gas stream;
 a first particulate collection system; and
 wherein the at least one nozzle is configured to inject the treating fluid into the cement kiln exhaust gas stream to form a combined stream before entering the particulate collection system and wherein the particulate collection system is configured to separate particulates comprising at least a portion of one heavy metal from the combined stream by forming modified cement kiln dust containing the heavy metal in non-leachable form.

2. The system of claim 1, wherein said treating fluid further comprises at least one selected from the group of a surfactant, a dispersant, and a hyperdispersant.

3. The system of claim 1, wherein said at least one nozzle is configured to spray droplets having a size configured to allow said droplets to have a minimum residence time of about 1 second to about 4 seconds.

4. The system of claim 3, wherein said at least one nozzle is configured to spray droplets having an average size of at least about 20 microns.

5. The system of claim 3, wherein said at least one nozzle is configured to spray droplets having an average size of about 30 microns to about 40 microns.

6. The system of claim 1, wherein said at least one nozzle is configured to spray droplets having a size configured to allow said droplets to have a minimum residence time of about 1 second to about 2 seconds.

7. The system of claim 6, wherein said at least one nozzle is configured to spray droplets having an average size of at least about 20 microns.

8. The system of claim 6, wherein said at least one nozzle is configured to spray droplets having an average size of about 30 microns to about 40 microns.

9. The system of claim 1, wherein the alkaline-earth metal sulfide comprises an alkaline-earth metal polysulfide.

10. The system of claim 1, wherein the treating fluid comprises the reagent and water in a ratio of about 1:1 to 1:10.

11. A system for reducing pollution in a material processing environment comprising:
 a treating fluid comprising a reagent containing a water soluble alkaline-earth metal sulfide in water, wherein the treating fluid comprises the reagent and water in a ratio of about 1:1 to 1:6;
 at least one nozzle configured to communicate with a cement kiln exhaust gas stream;
 a first particulate collection system; and
 wherein the at least one nozzle is configured to inject the treating fluid into the cement kiln exhaust gas stream to form a combined stream before entering the particulate collection system and wherein the particulate collection system is configured to separate particulates comprising at least a portion of one heavy metal from the combined stream by forming modified cement kiln dust containing the heavy metal in non-leachable form.

12. The system of claim 11, wherein said treating fluid further comprises at least one selected from the group of a surfactant, a dispersant, and a hyperdispersant.

13. The system of claim 11, wherein said at least one nozzle is configured to spray droplets having a size configured to allow said droplets to have a minimum residence time of about 1 second to about 4 seconds.

14. The system of claim 13, wherein said at least one nozzle is configured to spray droplets having an average size of at least about 20 microns.

15. The system of claim 13, wherein said at least one nozzle is configured to spray droplets having an average size of about 30 microns to about 40 microns.

16. The system of claim 11, wherein said at least one nozzle is configured to spray droplets having a size configured to allow said droplets to have a minimum residence time of about 1 second to about 2 seconds.

17. The system of claim 16, wherein said at least one nozzle is configured to spray droplets having an average size of at least about 20 microns.

18. The system of claim 16, wherein said at least one nozzle is configured to spray droplets having an average size of about 30 microns to about 40 microns.

19. The system of claim 11, wherein the alkaline-earth metal sulfide comprises an alkaline-earth metal polysulfide.

* * * * *